United States Patent
Farrell et al.

(10) Patent No.: US 8,336,731 B2
(45) Date of Patent: Dec. 25, 2012

(54) METHOD AND APPARATUS FOR ROTATIONALLY RESTRAINING A MIXING CONTAINER

(75) Inventors: James Farrell, Orinda, CA (US); Clayton Gardner, Alamo, CA (US)

(73) Assignee: F'Real Foods, LLC, Orinda, CA (US)

( * ) Notice: Subject to any disclaimer, the term of this patent is extended or adjusted under 35 U.S.C. 154(b) by 457 days.

(21) Appl. No.: 12/265,397

(22) Filed: Nov. 5, 2008

(65) Prior Publication Data
US 2010/0108696 A1    May 6, 2010

(51) Int. Cl.
B65D 25/20    (2006.01)
(52) U.S. Cl. .................. 220/738; 220/630
(58) Field of Classification Search .................. 220/608, 220/738, 630, 625, 626, 737; 215/373, 374, 215/375; 248/311.2; 366/206, 197
See application file for complete search history.

(56) References Cited

U.S. PATENT DOCUMENTS

| | | | |
|---|---|---|---|
| 37,046 A | 12/1862 | Mackey et al. | 220/636 |
| 496,674 A | 5/1893 | Urbach | |
| 934,537 A | 9/1909 | Johnson | |
| 1,313,830 A | 8/1919 | Minsk | |
| 1,592,788 A | 7/1926 | Supervielle | |
| 2,026,240 A | 12/1935 | Luxmore | 259/99 |
| 2,072,691 A | 3/1937 | Stark | 99/60 |
| 2,115,809 A | 5/1938 | Goldman | 259/99 |
| 2,123,496 A | 7/1938 | Briggs | |
| 2,440,425 A | 4/1948 | Williams | |
| 2,462,497 A | 2/1949 | Heyman | |
| 2,701,131 A | 2/1955 | Love | 259/126 |
| 2,898,094 A | 8/1959 | O'Neill, Jr. | 259/116 |
| 2,941,885 A | 6/1960 | Tomlinson | 99/54 |
| 2,967,433 A | 1/1961 | Phillips | 74/16 |
| 3,154,123 A | 10/1964 | Tomlinson | 146/68 |
| 3,171,635 A | 3/1965 | Haentjens et al. | 259/4 |
| 3,295,997 A | 1/1967 | Tomlinson et al. | 99/275 |
| 3,362,575 A | 1/1968 | Fotos | 220/97 |
| 3,503,757 A | 3/1970 | Rubenstein | 99/136 |
| 3,514,080 A | 5/1970 | Price et al. | 259/19 |
| 3,653,575 A | 4/1972 | Schrepper | |
| 3,738,619 A | 6/1973 | Shirae | 259/108 |
| 3,934,725 A | 1/1976 | Edwards | 206/519 |

(Continued)

FOREIGN PATENT DOCUMENTS

CA    804966    1/1969

(Continued)

OTHER PUBLICATIONS

Image of Six Vane Cup Design, sold by *f'Real! Foods, LLC*, 1999.

(Continued)

*Primary Examiner* — Stephen Castellano
(74) *Attorney, Agent, or Firm* — Duane Morris LLP; Guy W. Chambers

(57) ABSTRACT

A container for containing food and/or beverage ingredients is described. The container is of a type which may be supported in a support while the ingredients inside the container are processed, such as by a rotating blade or other mechanism. The container includes anti-rotation elements positionable in anti-rotational contact with a corresponding protruding portion in a container support in a manner which restricts rotational movement of the vessel relative to the container support. The off-set between each of the anti-rotation elements is an angle other than 180°.

17 Claims, 11 Drawing Sheets

U.S. PATENT DOCUMENTS

| | | | |
|---|---|---|---|
| 4,169,681 A | 10/1979 | Kato | 366/244 |
| 4,175,670 A * | 11/1979 | Reynolds et al. | 220/606 |
| 4,233,325 A | 11/1980 | Slangan | |
| 4,297,379 A | 10/1981 | Topalian et al. | 426/565 |
| 4,346,815 A | 8/1982 | Raymor | |
| 4,358,298 A | 11/1982 | Ratcliff | 55/185 |
| 4,388,356 A | 6/1983 | Hrivnak et al. | |
| 4,431,682 A | 2/1984 | Smith et al. | 426/565 |
| 4,434,186 A | 2/1984 | Desia et al. | 426/565 |
| 4,542,035 A | 9/1985 | Huang et al. | 426/565 |
| 4,544,277 A | 10/1985 | Schnellmann | 366/78 |
| 4,547,076 A | 10/1985 | Maurer | 366/244 |
| 4,549,811 A | 10/1985 | Schiffner | |
| 4,551,026 A | 11/1985 | Cristante | |
| 4,588,136 A | 5/1986 | Homma | |
| 4,609,561 A | 9/1986 | Wade et al. | 426/565 |
| 4,708,487 A | 11/1987 | Marshall | |
| 4,740,088 A | 4/1988 | Kelly | |
| 4,818,554 A | 4/1989 | Giddey et al. | 426/564 |
| 4,821,906 A | 4/1989 | Clark | |
| 4,830,868 A | 5/1989 | Wade et al. | 426/565 |
| 4,988,529 A | 1/1991 | Nakaya et al. | 426/569 |
| 5,000,974 A | 3/1991 | Albersmann | 426/564 |
| 5,040,698 A | 8/1991 | Ramsey et al. | |
| 5,112,626 A | 5/1992 | Huang et al. | 426/43 |
| 5,150,967 A | 9/1992 | Neilson et al. | 366/206 |
| 5,178,351 A | 1/1993 | Lesage | 248/146 |
| 5,186,350 A | 2/1993 | McBride | 220/739 |
| 5,328,263 A | 7/1994 | Neilson | 366/254 |
| 5,439,289 A | 8/1995 | Neilson | 366/207 |
| 5,465,891 A | 11/1995 | Bridges | 224/566 |
| 5,474,206 A | 12/1995 | Herring, Sr. | 220/636 |
| 5,503,283 A * | 4/1996 | Semersky | 215/375 |
| 5,580,007 A | 12/1996 | Caviezel et al. | 241/199.12 |
| 5,593,712 A | 1/1997 | Poilane | |
| 5,599,103 A | 2/1997 | Linscott | 366/343 |
| 5,653,157 A | 8/1997 | Miller | |
| 5,669,288 A | 9/1997 | Zittel | |
| 5,782,985 A | 7/1998 | Manser | |
| 5,803,377 A | 9/1998 | Farrell | 241/36 |
| 5,962,060 A | 10/1999 | Farrell | 426/565 |
| 6,041,961 A | 3/2000 | Farrell | 220/608 |
| 6,071,006 A | 6/2000 | Hochstein | |
| 6,293,691 B1 | 9/2001 | Reberdosa | |
| 6,326,047 B1 | 12/2001 | Farrell | 426/524 |
| 6,378,723 B1 * | 4/2002 | Casey | 220/608 |
| 6,465,034 B2 | 10/2002 | Farrell | 426/524 |
| 6,474,862 B2 | 11/2002 | Farrell | 366/147 |
| 6,527,207 B1 | 3/2003 | Farrell et al. | 241/23 |
| 6,634,517 B2 * | 10/2003 | Cheng et al. | 215/373 |
| 7,144,150 B2 | 12/2006 | Farrell | |
| 7,351,385 B1 | 4/2008 | Batten et al. | |
| 7,473,026 B2 | 1/2009 | Clawson | |
| 2003/0205148 A1 * | 11/2003 | Rubin et al. | 99/452 |
| 2005/0193896 A1 | 9/2005 | McGill | |
| 2005/0193901 A1 | 9/2005 | Buehler | |
| 2005/0254341 A1 | 11/2005 | Gerling et al. | |
| 2008/0210697 A1 | 9/2008 | Kessell et al. | |
| 2009/0291174 A1 | 11/2009 | Lewis | |

FOREIGN PATENT DOCUMENTS

| | | |
|---|---|---|
| DE | 2 158 002 | 5/1973 |
| DE | 25 09 583 | 9/1975 |
| DE | 3935548 | 5/1991 |
| EP | 1022054 | 9/2003 |
| GB | 492940 | 9/1938 |
| GB | 1508574 | 4/1978 |
| GB | 733645 | 7/1995 |
| WO | WO2009041836 | 2/2009 |
| WO | WO2009027131 | 3/2009 |
| WO | WO2009041835 | 4/2009 |
| WO | WO2010064042 | 6/2010 |

OTHER PUBLICATIONS

The European Search Report—dated Jan. 26, 2012 (6 pages).

* cited by examiner

METHOD AND APPARATUS FOR ROTATIONALLY RESTRAINING A MIXING CONTAINER

TECHNICAL FIELD OF THE INVENTION

The present invention relates generally to the field of food and beverage containers and specifically to containers for holding foods and/or beverages during blending, whipping, stirring, etc.

BACKGROUND

Preparation of certain foods and beverages can involve blending, whipping, stirring, etc. the food or beverage using a rotary blade or mixer.

Methods and systems for making frozen drinks are described in patent numbers U.S. Pat. No. 5,803,377, U.S. Pat. No. 5,962,060, U.S. Pat. No. 6,326,047, U.S. Pat. No. 6,465,034, U.S. Pat. No. 6,474,862, U.S. Pat. No. 6,527,207 and U.S. Pat. No. 7,144,150, which are commonly-owned with the present application and which are incorporated herein by reference. These patents describes an apparatus which allows milkshakes and other frozen drinks to be quickly made by breaking up pre-frozen blocks of ingredients into small frozen particles using a rotating blade, and blending them with an added liquid also using the rotating blade. The ingredients to be frozen into frozen blocks are pre-mixed in liquid form, placed into serving cups which are the same serving cups in which the finished milkshake or frozen drinks are to be served, and then frozen into blocks conforming to the insides of the serving cups and stored.

According to the prior patents, when a milkshake or other frozen drink is to be made, a serving cup containing the frozen block is positioned in a cup holder which forms a part of the frozen drink machine. A rotating blade is lowered into the cup and bores through the frozen substance in the cup, grinding it into small frozen particles. Milk, water, or another liquid is added to the cup and is blended into the frozen substance by the rotating blade. The rotating blade also whips air into the frozen particle mixture in order to give the milkshake or frozen drink its proper volume, texture, and flavor delivery.

In this and other contexts, it is desirable to provide a container for a frozen drink (or other food or beverage) which may be supported in a cup holder while the ingredients the container inside are processed, and which is restrained against rotation which would otherwise be caused by the action of the rotating blade or other processing tool. It is further desirable to provide a container having an anti-rotation feature and which container is further suitable for serving directly to customers after its removal from the cup holder.

Various solutions are disclosed in U.S. Pat. No. 6,041,961 ('691 patent), which is also commonly owned with the present application and incorporated herein by reference. In one of the illustrated embodiments, that patent shows a cup bottom having an anti-rotation pattern extending from its lower surface. The patent shows in FIGS. 1 and 2 a pattern formed of six arcuate ridges radiating from a center portion of the cup bottom. The patent shows corresponding anti-rotation features, shown in FIG. 5 as a pattern of six radiating ribs, on the support upon which the cup sits during processing of the beverage within the cup. Because of the six-ridge/six-rib patterns, the illustrated embodiment creates six areas of contact between the anti-rotation pattern on the cup bottom and the anti-rotation features of the support. Each ridge on the cup bottom includes a sloped side wall that acts as a self aligning mechanism, so that if a cup is placed onto the support and the sloped side wall contacts the corresponding rib before the cup is fully seated, the angled wall causes the cup to twist slightly so that the cup slides into a fully engaged position within the anti-rotation pattern in the cup holder.

In a further modification put into commercial use, the number of anti-rotation elements on the cup support (not shown) was reduced to two members 48 or ribs spaced 180° as shown in FIG. 1, while the anti-rotation pattern 102 on the cup 100 remained at six ridges 104. Obviously, given the 180° spacing between the ribs, the pair of the ridges that are engaged by the ribs are likewise spaced 180°, giving balanced, symmetrical, restriction against rotation while imparting evenly balanced loads to the cup's anti-rotation pattern. Distributing/balancing the loads prevents damage to the cup during use and allows thinner walls to be used in the anti-rotation features of the cup, thus minimizing resin costs in the manufacture of the cup.

On occasion, the prior art cup of FIG. 1 will seat against the members 48 in a manner that prevents the cup from advancing fully onto the cup support. This positions the cup higher onlin the cup support than is intended, causing the interior of the cup bottom to be damaged by the mixing element processing the contents of the cup. The risk that the cup will be improperly positioned in this way is greatest in situations where consumers place the cup in the cup holder for themselves in a self-serve setting. Because these consumers are not aware of the need to be sure the cup fully advances into the cups support, it is important that the possibility of the lack of such full advancement be eliminated. To this end, the applicant has developed a new anti-rotation arrangement that promotes more consistent seating of the cup within the cup support.

DETAILED DESCRIPTION

Figure 1:
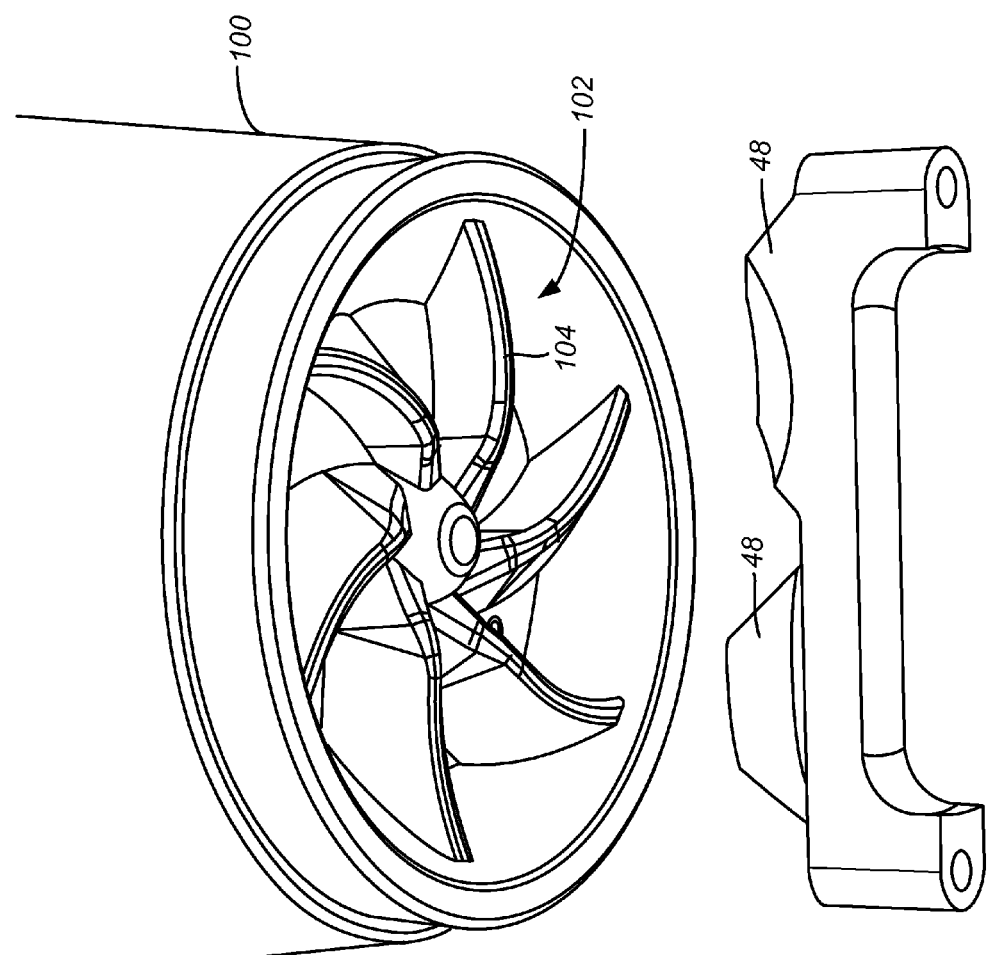
FIG. 1 is a perspective view showing a bottom portion of a cup with a prior art anti-rotation feature. The cup is shown above a portion of a cup support having anti-rotation members engageable with the anti-rotation feature of the cup.
Figure 2:
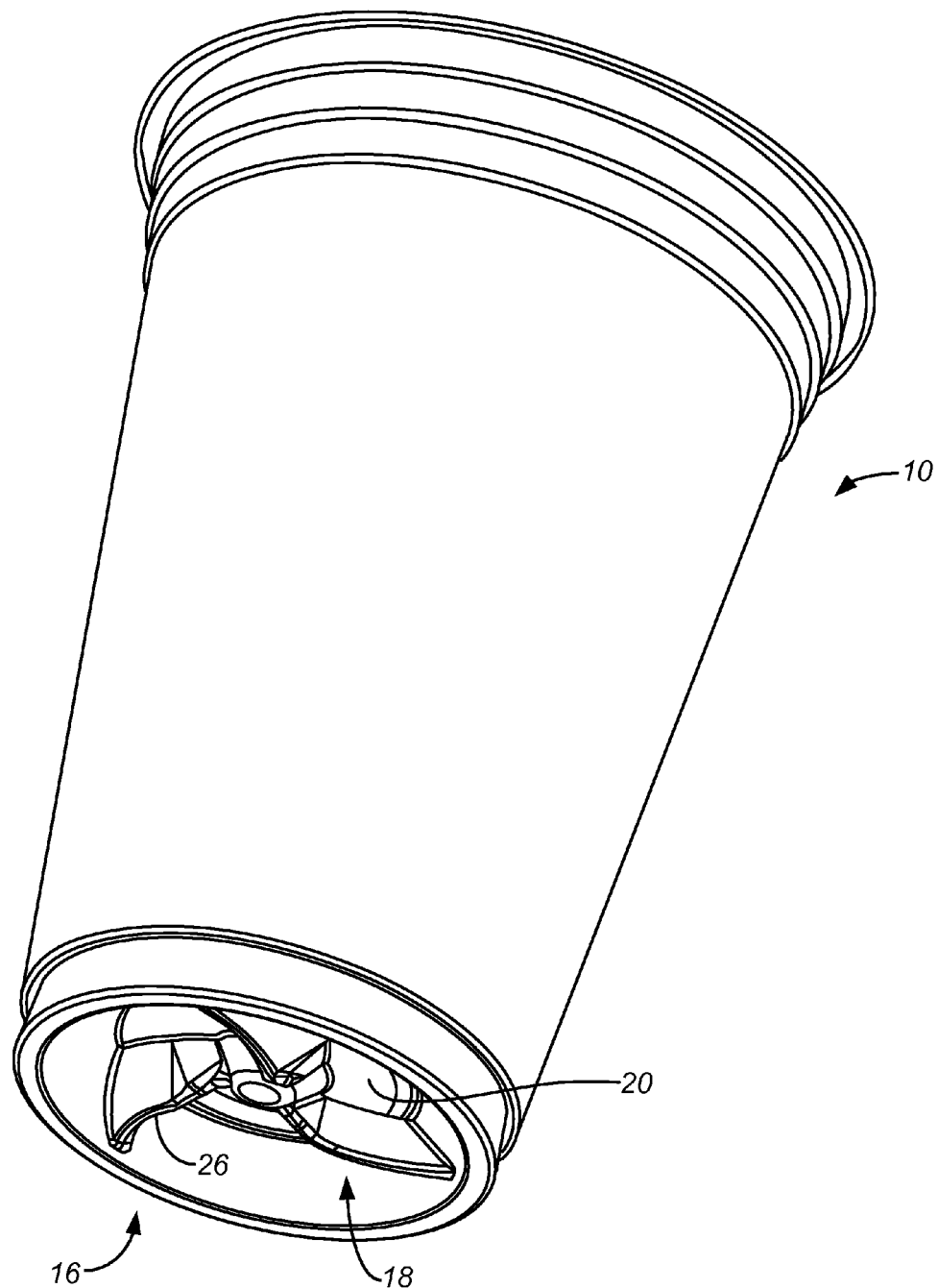
FIG. 2 is a perspective view of a cup showing a first embodiment of a new anti-rotation pattern.
Figure 3A:
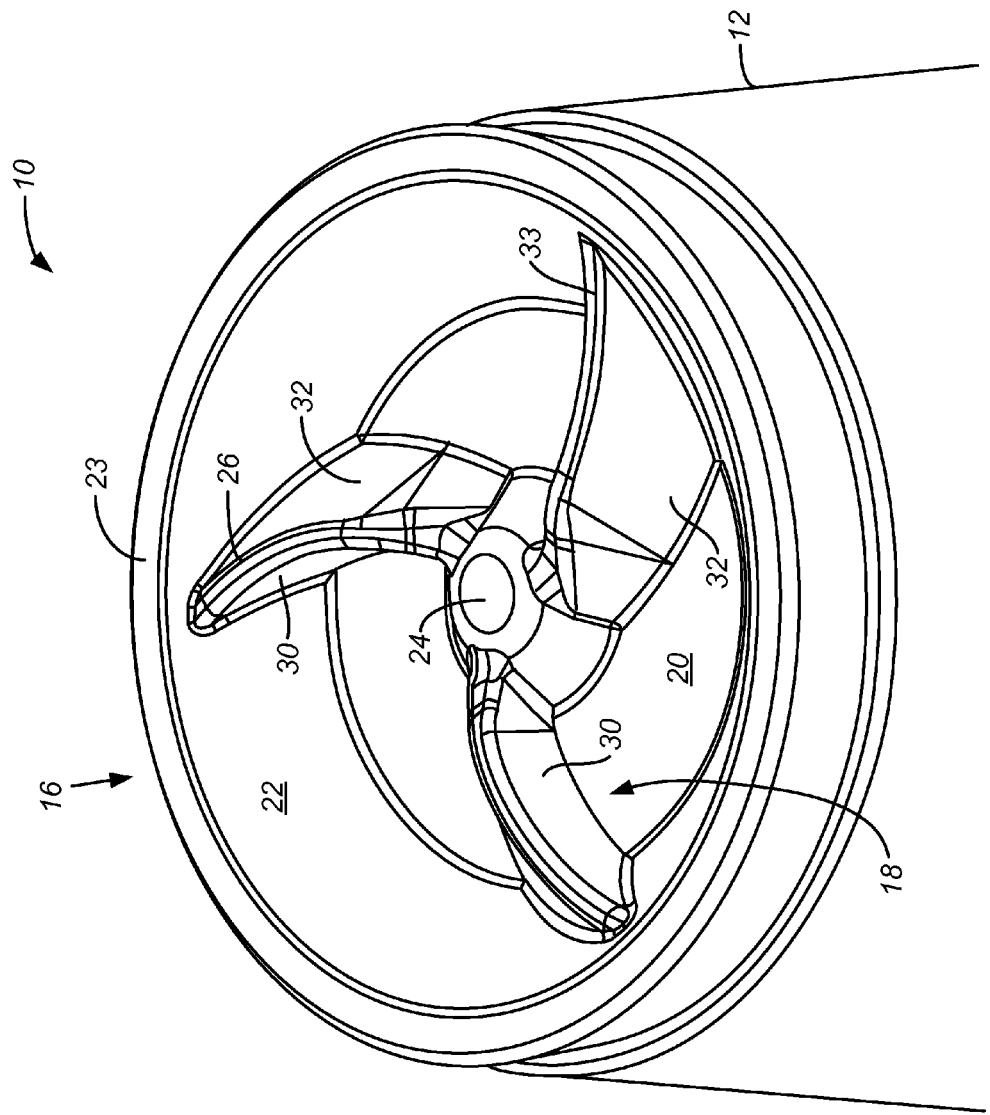
FIG. 3A is a perspective view of the bottom of the cup of FIG. 2.
Figure 3B:
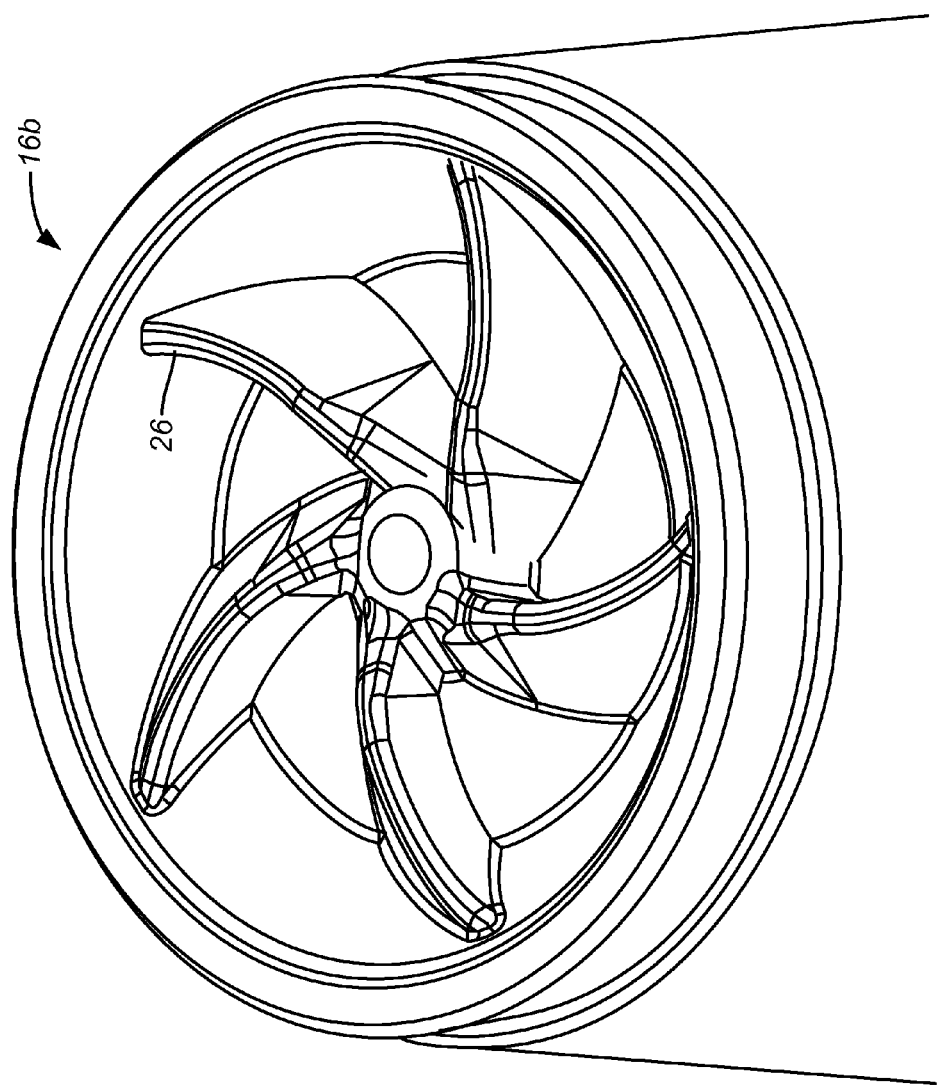
FIG. 3B is a perspective view of an alternative bottom for the cup of FIG. 2.
Figure 4:
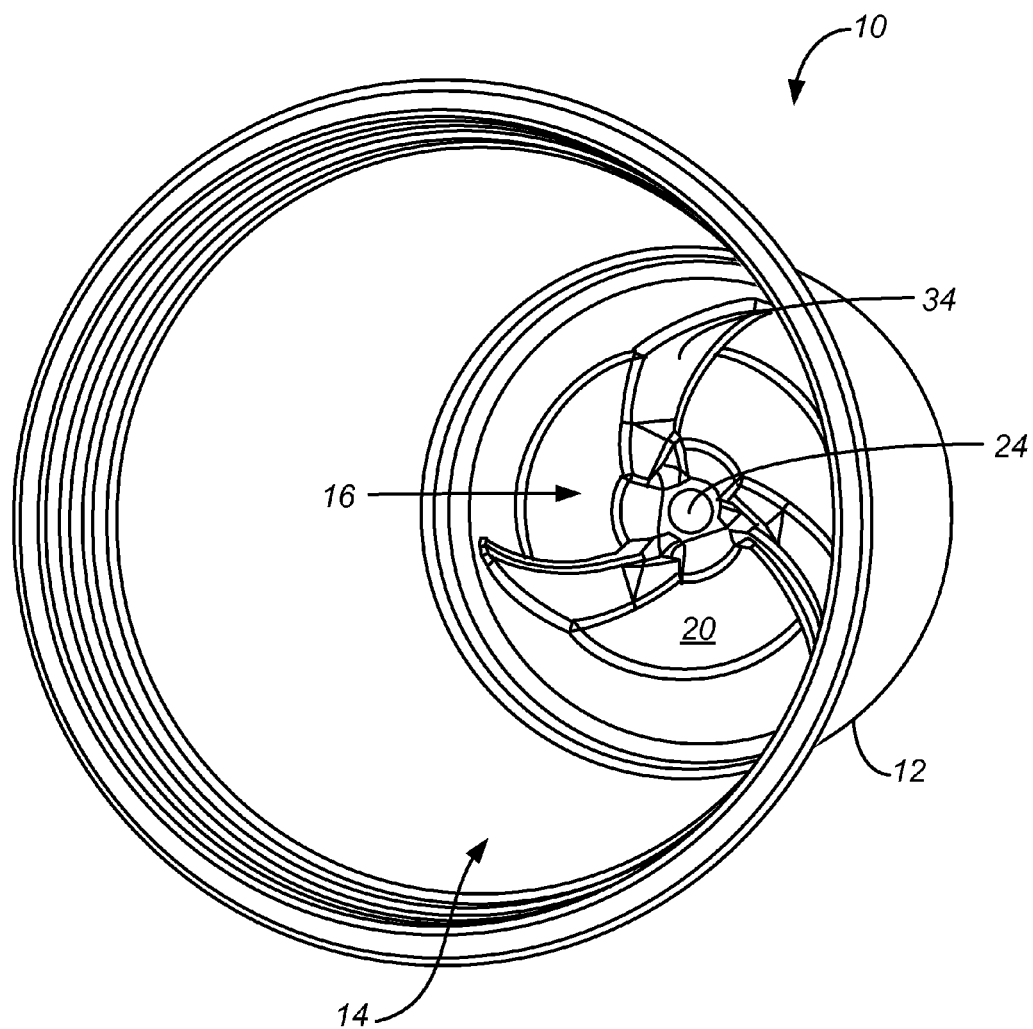
FIG. 4 is a perspective view of the cup of FIG. 2, showing the cup interior.

FIGS. 2-4 show perspective views of an embodiment of a container 10. Container 10 (which will also be referred to as a cup) includes a cup wall 12 that defines an interior 14 (FIG. 4), and a cup bottom 16. During use, the container 10 contains food or beverage ingredients that are to be processed inside the cup using a rotating blade or other boring and/or blending device. Container 10 is provided with an anti-rotation mechanism designed to engage the container within a cup holder associated with the boring/blending device so as to prevent rotation of the cup during processing.

Anti-rotation pattern 18 is formed in the cup bottom 16. Pattern 18 includes outwardly protruding vanes 26 positioned to engage with a corresponding anti-rotation feature (described below) in a corresponding cup holder. In the FIG. 3A embodiment, three vanes are shown spaced 120° apart, however in other embodiments different numbers of vanes, including one or five vanes (see e.g. the 5-vane embodiment of FIG. 3B) might be used. Preferably, however, the vanes are arranged such that no two vanes are separated by 180°.

Referring to FIG. 3A, the cup bottom includes a circular center section 20 and a beveled circumferential section 22 extending between center section 20 and an outer rim 23. The cup bottom 16 further includes a recessed center portion 24 (as viewed from the cup interior) centered in the circular center section 20.

Vanes 26 radiate from the recessed center portion 24 and extend downwardly from the bottom surface of center section 20. Trailing edges 28 extend from each arcuate ridge 26 into the beveled circumferential section 22. Each vane 26 preferably includes a substantially triangular cross-section, formed by first and second side walls 30, 32 which meet along ridge 33. In the illustrated embodiment, the wall 30 is vertical or near vertical relative to center section 20, and the surface wall 32 is angled or curved in a counterclockwise direction as viewed from the bottom of the cup as in FIG. 3A. As is also visible in FIG. 3A, the lower edge of each of the walls 30, 32 (i.e. along the center surface 20) curves slightly in a counterclockwise direction. In a preferred embodiment of the container, the walls 30, 32 are joined at an angle of approximately 45°. The portion of the vane 26 facing the cup interior 14 forms a hollow groove 34 as shown in FIG. 4.

The triangular configuration of the anti-rotation pattern enhances the rigidity of the cup during use by creating a triangular structural element and by allowing the cup's ingredients to freeze down into the groove 34 created by the angled/curved wall 32 to form a frozen, rigid backing for the anti-rotation pattern. The other side wall 30 is approximately straight up and down so that as it resists rotation by pressing against a corresponding cup holder member, there is no upward force created, as would be the case if it were angled like the other side. In fact, by bringing this face 30 past vertical, a downward force can be generated which helps to keep the cup seated on the cup holder as torque is applied.

It should be noted that shapes other than a triangular cross-section, such as a rectangular cross-section, would also be quite effective in preventing rotation and (as with the triangular cross-section) would have the benefit of added strength due to their wide cross-section at the point where they meet the cup bottom. They would also posses the advantage of allowing the cup's ingredients to freeze down into the rectangular or other shaped groove created by the cross-section to form a frozen, rigid backing for the anti-rotation pattern.

Figure 5:
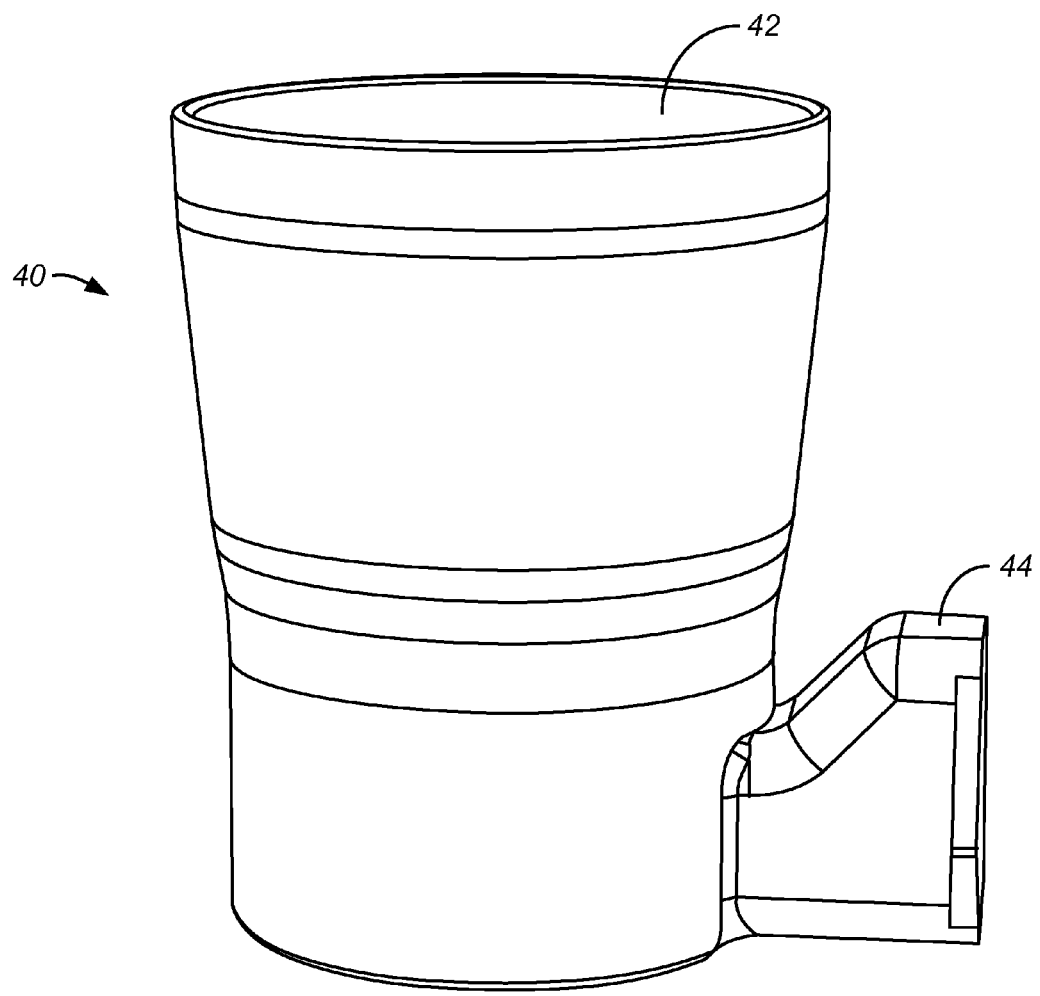
FIG. 5 is a perspective view of an exemplary cup holder.

FIG. 5 illustrates one type of cup holder 40 that might be used to support the cup 10 when used in frozen drink machine of the type described in the above-referenced prior patents, or in the frozen drink blender available from f'REAL! Foods, LLC, Orinda, Calif. As discussed in the prior patents, the frozen drink machine includes a rotatable blade on a shaft that is extendable into the cup 10. During use, the rotatable blade is lowered into the cup 10, where it grinds the frozen ingredients in the container and where it blends the ground frozen ingredients with an added liquid.

Figure 6:
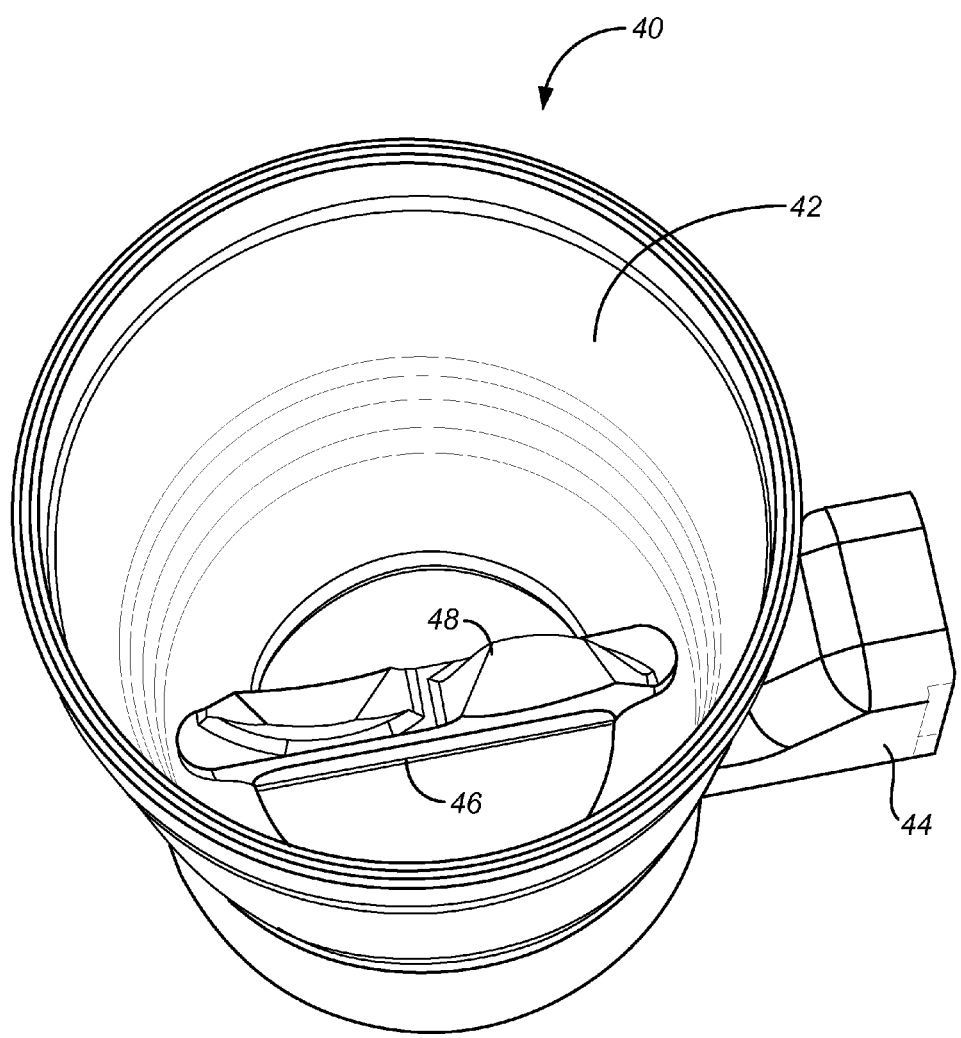
FIG. 6 is a perspective view showing the interior of the cup holder of FIG. 5.
Figure 7:
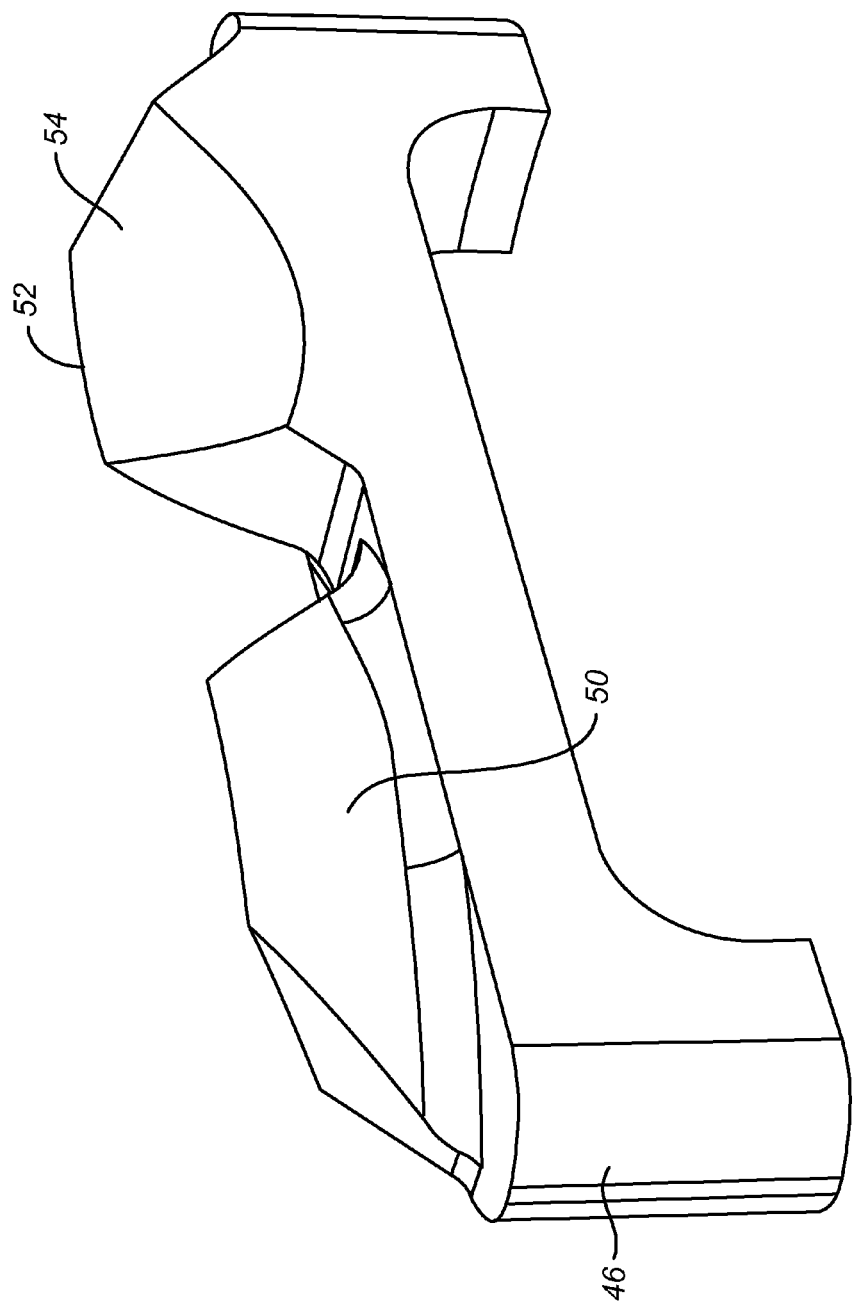
FIG. 7 is a perspective view of the bracket and anti-rotation members of the cup holder of FIG. 5.

The cup holder 40 has an interior 42 for receiving the container 10 and a connector 44 that couples the cup holder to the blender or other type of food/beverage processor. Referring to FIG. 6, disposed within the interior 42 is a bracket 46 having anti-rotation members such as fins 48, each of which is laterally offset from the longitudinal axis of the holder 40 (and thus the cup 10). As best shown in FIG. 7, each fin 48 is provided with a wall 50 shaped to seat against wall 30 of one of the vanes 26 on the cup bottom. Wall 50 forms a ridge 52 at its intersection with a second, more curved, wall 54. This embodiment uses a pair of fins positioned 180° apart from one another as shown.

Figure 8:
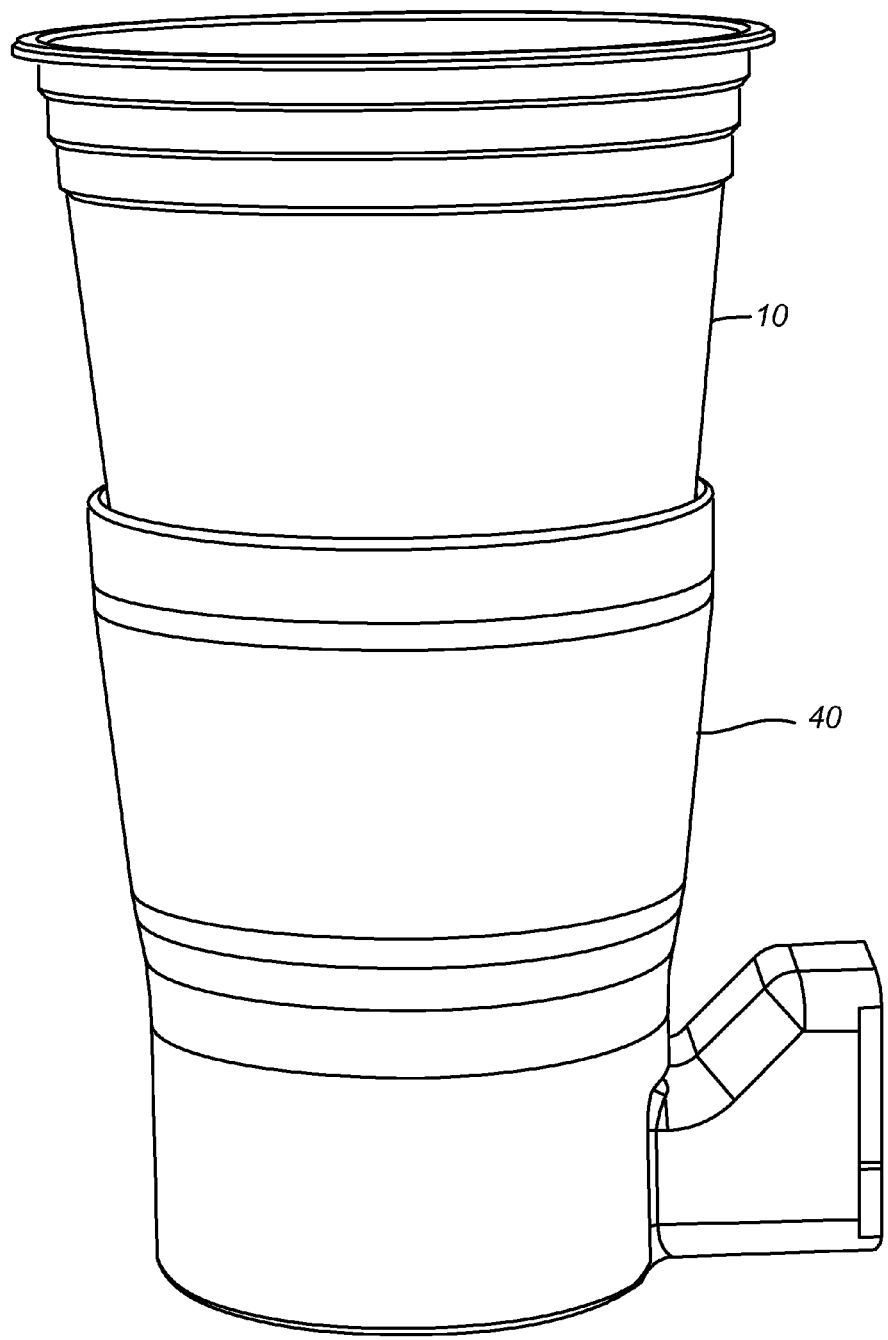
FIG. 8 is similar to FIG. 5 and shows the cup positioned in the cup holder.
Figure 9:
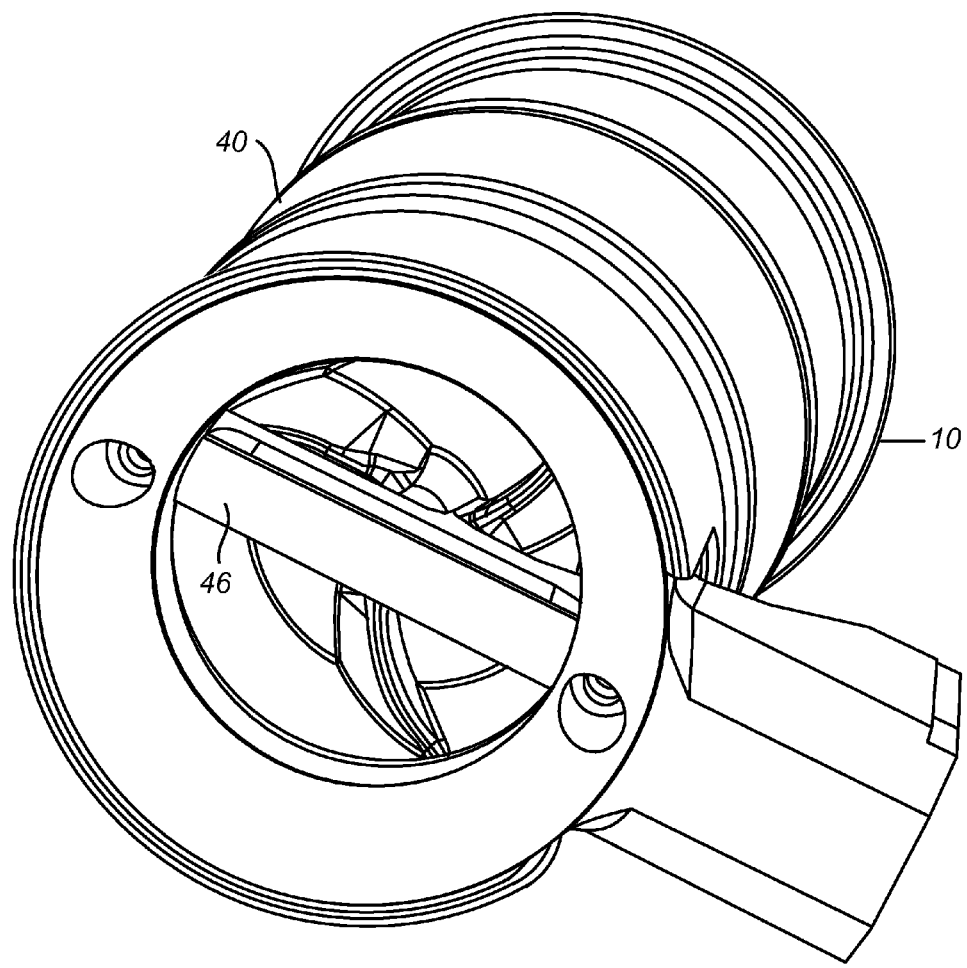
FIG. 9 is a bottom perspective view showing the cup in the cup holder.
Figure 10:
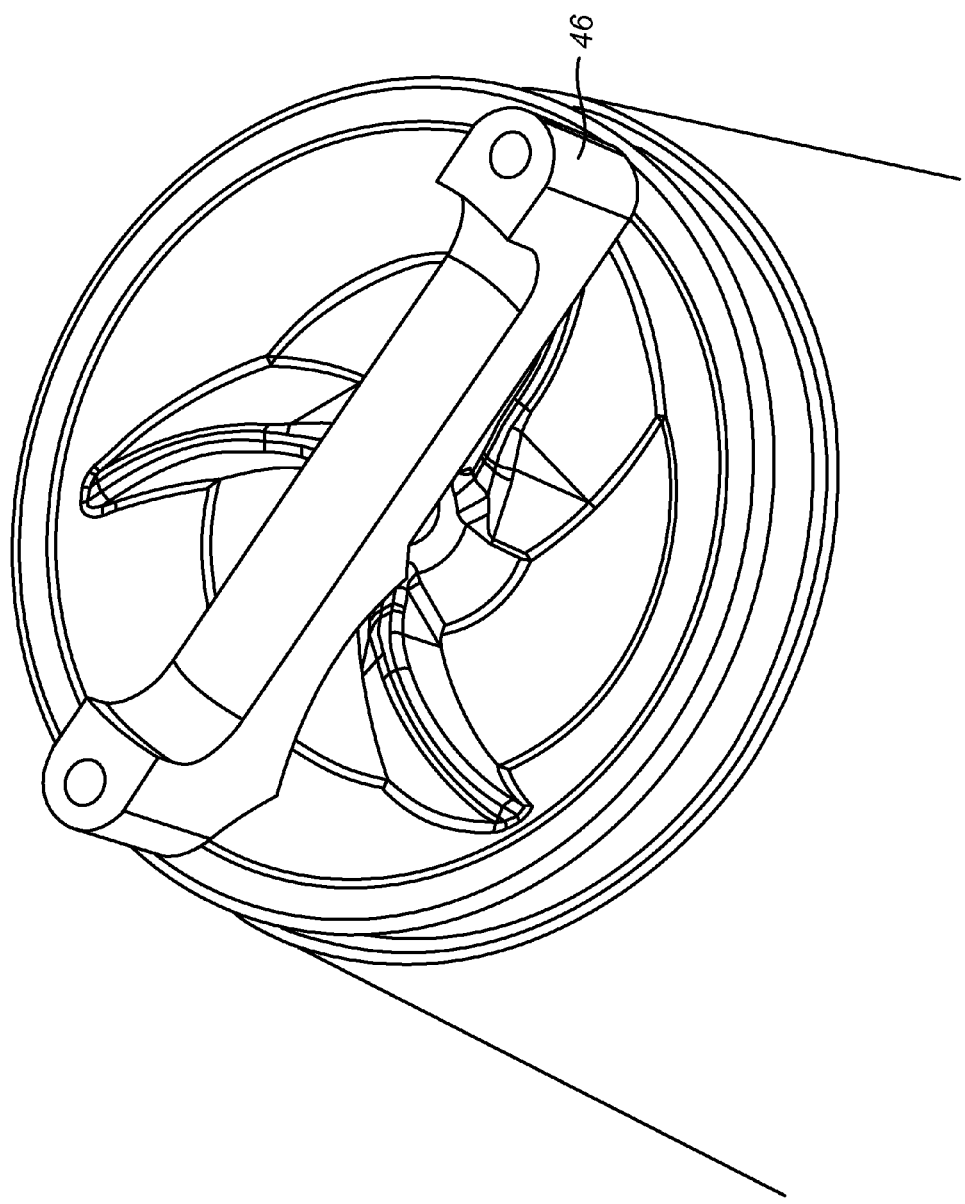
FIG. 10 is similar to FIG. 9, but shows only the bracket of the cup holder.

During use of container 10 with the cup holder 40 of a corresponding machine, the container is inserted into the interior of the cup holder as shown in FIG. 8. As the container 10 moves into the holder 40, one of the fins 48 moves into contact with the wall 30 of one of the vanes sufficient to prevent rotation of the cup within the holder during processing (e.g. grinding and blending) using a rotating blade in the cup. Since the fins 48 are separated by 180°, but no two vanes are separated by 180°, anti-rotational contact (i.e. contact that will restrain the cup against rotation during processing of the cup contents using a grinding, boring and/or mixing element) occurs only between a single one of the vanes and a single one of the fins, giving asymmetrical anti-rotational contact between the cup and the cup holder.

In an alternate embodiment of a holder 40, the anti-rotation features within the holder 40 are modified to eliminate one of the fins 48 on the bracket 46, leaving just a single fin (and thus a single anti-rotational contact) laterally offset from the center of the bracket 46. This holder is suitable for use with a cup having any number of vanes (whether even or odd), including vanes that are spaced 180° apart.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

Any and all patents and patent applications referred to herein, including for purposes of priority, are incorporated herein by reference for all purposes.

What is claimed is:

1. A cup comprising:
an open top, cup walls and a closed bottom having an anti-rotational pattern protruding downwardly from a generally flat bottom surface,
wherein said anti-rotational pattern comprises a plurality of downwardly protruding vanes of substantially triangular cross-section each extending outwardly from a center portion of said bottom and each having two downwardly pointing vane walls forming an angle of approximately 45 degrees or less which are joined at a ridge wherein one of said vane walls is substantially vertical and the ridges of no
two vanes are separated by 180 degrees, and
further comprising a cupholder having a pair of cupholder fins that are positioned 180 degrees apart from one another such that, if said anti-rotational pattern is placed against one of said pair of cupholder fins, said cup will be inhibited from rotating within said cupholder.

2. The cup of claim 1 wherein the number of vanes is three.

3. The cup of claim 2 wherein said vanes are equidistant from one another.

4. The cup of claim 1 wherein the number of vanes is five.

5. The cup of claim 1 wherein said cup walls are circular in cross-section.

6. The cup of claim 5 further comprising a downwardly protruding outer bottom rim.

7. The cup of claim 6 wherein each of said protruding vanes continuously extend from said center portion to said protruding outer bottom rim.

8. The cup of claim 7 wherein said center portion is also downwardly protruding.

9. The cup of claim 1 wherein each of said vanes of substantially triangular cross-section have a base contiguous with said generally flat bottom surface and a downwardly pointing apex.

10. The cup of claim 9 wherein the apex of each vane forms an arc as it extends from said center portion to the outer periphery of said bottom.

11. A cup comprising:
   an open top, cup walls and a closed bottom having an anti-rotational pattern protruding downwardly from a generally flat bottom surface,
   wherein said anti-rotational pattern comprises an odd number of downwardly protruding vanes of substantially triangular cross-section each extending continuously outwardly in an arc from a downwardly protruding center portion to a downwardly protruding outer bottom rim and each having two downwardly pointing vane walls forming an angle of approximately 45 degrees or less which are joined at a ridge wherein one of said vane walls is substantially vertical and the ridges of no two vanes are separated by 180 degrees, and
   further comprising a cupholder having a pair of cupholder fins that are positioned 180 degrees apart from one another such that, if said anti-rotational pattern is placed against one of said pair of cupholder fins, said cup will be inhibited from rotating within said cupholder.

12. The cup of claim 11 wherein the number of vanes is either three or five.

13. The cup of claim 12 wherein said vanes are equidistant from one another.

14. The cup of claim 11 wherein said vanes form a counterclockwise arc as viewed from the bottom of said cup.

15. The cup of claim 11 wherein each of said vanes of substantially triangular cross-section have a base contiguous with said generally flat bottom surface and a downwardly pointing apex.

16. A cup capable of being fixedly placed within a cupholder comprising:
   an open top, cup walls and a closed bottom having an anti-rotational pattern protruding downwardly from a generally flat bottom surface which, if said anti-rotational pattern is placed against one of a pair of cupholder fins that are positioned 180 degrees apart from one another, is capable of fixing said cup within said cupholder in a way that inhibits said cup from rotating within said cupholder;
   wherein said anti-rotational pattern comprises a plurality of downwardly protruding vanes of substantially triangular cross-section each extending outwardly from a center portion of said bottom and each having two downwardly pointing vane walls forming an angle of approximately 45 degrees or less which are joined at a ridge wherein one of said vane walls is substantially vertical and the ridges of no two vanes are separated by 180 degrees, and
   further comprising a cupholder having a pair of cupholder fins that are positioned 180 degrees apart from one another.

17. A cup capable of being fixedly placed within a cupholder comprising:
   an open top, cup walls and a closed bottom having an anti-rotational pattern protruding downwardly from a generally flat bottom surface which, if said anti-rotational pattern is placed against one of a pair of cupholder fins that are positioned 180 degrees apart from one another, is capable of fixing said cup within said cupholder in a way that inhibits said cup from rotating within said cupholder;
   wherein said anti-rotational pattern comprises an odd number of downwardly protruding vanes of substantially triangular cross-section each extending continuously outwardly in an arc from a downwardly protruding center portion to a downwardly protruding outer bottom rim and each having two downwardly pointing vane walls forming an angle of approximately 45 degrees or less which are joined at a ridge wherein one of said vane walls is substantially vertical and the ridges of no two vanes are separated by 180 degrees, and
   further comprising a cupholder having a pair of cupholder fins that are positioned 180 degrees apart from one another.

* * * * *